United States Patent
Feng

(10) Patent No.: US 10,184,791 B2
(45) Date of Patent: Jan. 22, 2019

(54) MEASURING DEVICE AND MEASURING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yu-Zhong Feng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 222 days.

(21) Appl. No.: 15/231,712

(22) Filed: Aug. 8, 2016

(65) Prior Publication Data

US 2017/0146342 A1   May 25, 2017

(30) Foreign Application Priority Data

Nov. 20, 2015 (CN) .......................... 2015 1 0808867

(51) Int. Cl.
| | |
|---|---|
| *G01B 21/04* | (2006.01) |
| *G01S 15/88* | (2006.01) |
| *G01B 17/06* | (2006.01) |
| *G01S 7/521* | (2006.01) |
| *G01S 15/89* | (2006.01) |
| *G01S 17/89* | (2006.01) |
| *G01S 7/481* | (2006.01) |

(52) U.S. Cl.
CPC ........... *G01B 21/047* (2013.01); *G01B 17/06* (2013.01); *G01B 21/04* (2013.01); *G01S 7/521* (2013.01); *G01S 15/88* (2013.01); *G01S 15/89* (2013.01); *G01S 7/4817* (2013.01); *G01S 17/89* (2013.01)

(58) Field of Classification Search
CPC ...... G01B 21/047; G01B 21/04; G01B 17/06; G01S 7/521; G01S 15/89; G01S 15/88; G01S 7/4817; G01S 17/89
See application file for complete search history.

(56) References Cited

U.S. PATENT DOCUMENTS

| | | | |
|---|---|---|---|
| 2011/0288818 A1* | 11/2011 | Thierman .............. | G01B 11/00 702/159 |
| 2012/0154824 A1* | 6/2012 | Kim ......................... | G01S 5/16 356/623 |
| 2013/0108116 A1* | 5/2013 | Suzuki ................. | G01B 11/002 382/106 |

(Continued)

*Primary Examiner* — John Breene
*Assistant Examiner* — Mohammad Islam
(74) *Attorney, Agent, or Firm* — ScienBiziP, P.C.

(57) ABSTRACT

A method for measuring three dimensional coordinates of each of points on a surface of an object includes pre-storing an algorithm that includes a plurality of parameters. A driving device is controlled to drive a distance sensor to move to each of measuring positions, and a first distance between each of the points and the distance sensor is obtained using the distance sensor. Each position information of the distance sensor is obtained using a position sensor, when the distance sensor is located at each of the measuring positions. Once a parameter of a reference coordinate is determined, the three dimensional coordinates of each of the points is computed using the algorithm based on the plurality of parameters.

16 Claims, 6 Drawing Sheets

(56) References Cited

U.S. PATENT DOCUMENTS

| | | | | |
|---|---|---|---|---|
| 2015/0204976 A1* | 7/2015 | Bosch | ................... | G01B 11/26 |
| | | | | 356/4.01 |
| 2015/0285616 A1* | 10/2015 | Jordil | ................... | G01B 21/047 |
| | | | | 348/135 |
| 2015/0309174 A1* | 10/2015 | Giger | ................... | G01C 11/02 |
| | | | | 382/106 |
| 2015/0346319 A1* | 12/2015 | Wuersch | .............. | G01C 15/002 |
| | | | | 356/623 |
| 2016/0283792 A1* | 9/2016 | Okazaki | ............. | G06K 9/00664 |

* cited by examiner

MEASURING DEVICE AND MEASURING METHOD

CROSS-REFERENCE TO RELATED APPLICATIONS

This application claims priority to Chinese Patent Application No. 201510808867.4 filed on Nov. 20, 2015, the contents of which are incorporated by reference herein.

FIELD

The present disclosure relates generally to the field of measuring, and particularly relates to a measuring device and a measuring method.

BACKGROUND

Three dimensional measurement of an object is used for industrial design and manufacturing, mass detection and control, terrain measurement and surveys. The present three dimensional measuring devices in the market are complicated, and manufacturing cost is high.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
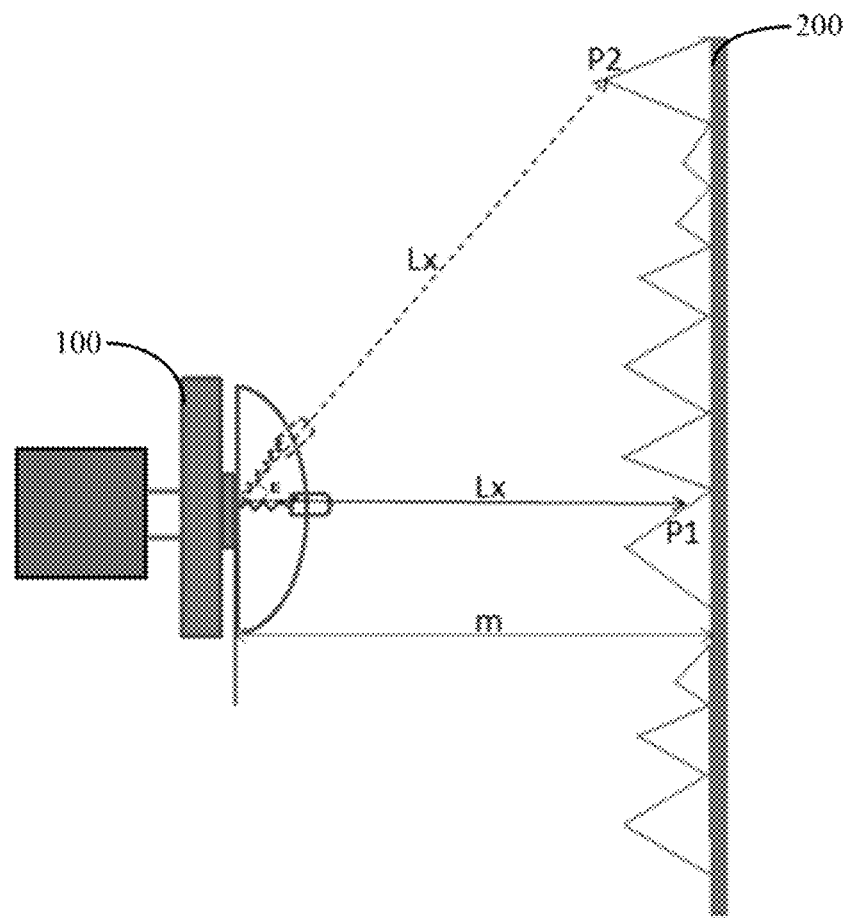
FIG. 1 is a schematic view illustrating an exemplary embodiment of a measuring device of the present disclosure.

The following disclosure provides many different embodiments, or examples, for implementing different features of the provided subject matter. Specific examples of components and arrangements are described below to simplify the exemplary disclosure. These are, of course, merely examples and are not intended to be limiting. For example, the formation of the first feature over or on a second feature in the description that follows may include embodiments in which the first and second features are in direct contact, and may also include embodiments in which additional features may be formed between the first and second features, such that the first and second features may not be in direct contact. In addition, the exemplary disclosure may repeat reference numerals and/or letters in the various examples. Such repetition is for the purpose of simplicity and clarity and does not in itself dictate a relationship between the various embodiments and/or configurations discussed.

For consistency of purpose and ease of understanding, like features are identified (although, in some instances, not shown) by numerals in the drawing figures. However, the features in different embodiments may differ in other respects, and thus shall not be narrowly confined to what is shown in the figures.

For consistency and ease of understanding, like features are identified (although, in some instances, not shown) with like numerals in the figures. However, the features in different embodiments may differ in other respects, and thus shall not be narrowly confined to what is shown in the figures.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Persons skilled in the art recognize that any computer system having suitable programming means will be capable of executing the steps of the method of the present disclosure. Although some of the exemplary embodiments described in this specification are oriented to software installed and executed on computer hardware, alternative exemplary embodiments implemented as firmware or as hardware or as a combination of hardware and software are within the scope of the present disclosure.

A measuring device with simple structure for measuring three dimensional coordinates is described. Also, a method for measuring three dimensional coordinates of the points on the surface of an object is also provided.

FIG. 1 illustrates an exemplary embodiment of a measuring device. Depending on the embodiment, a measuring device 100 contactlessly measures three dimensional coordinates of points on a surface of an object 200. Based on the measured coordinates, the surface of the object 200 can be reconstructed. The form of the object 200 should not be taken as limiting the scope of the present invention, the object 200 can be a road, or a face of a human.

Figure 2:
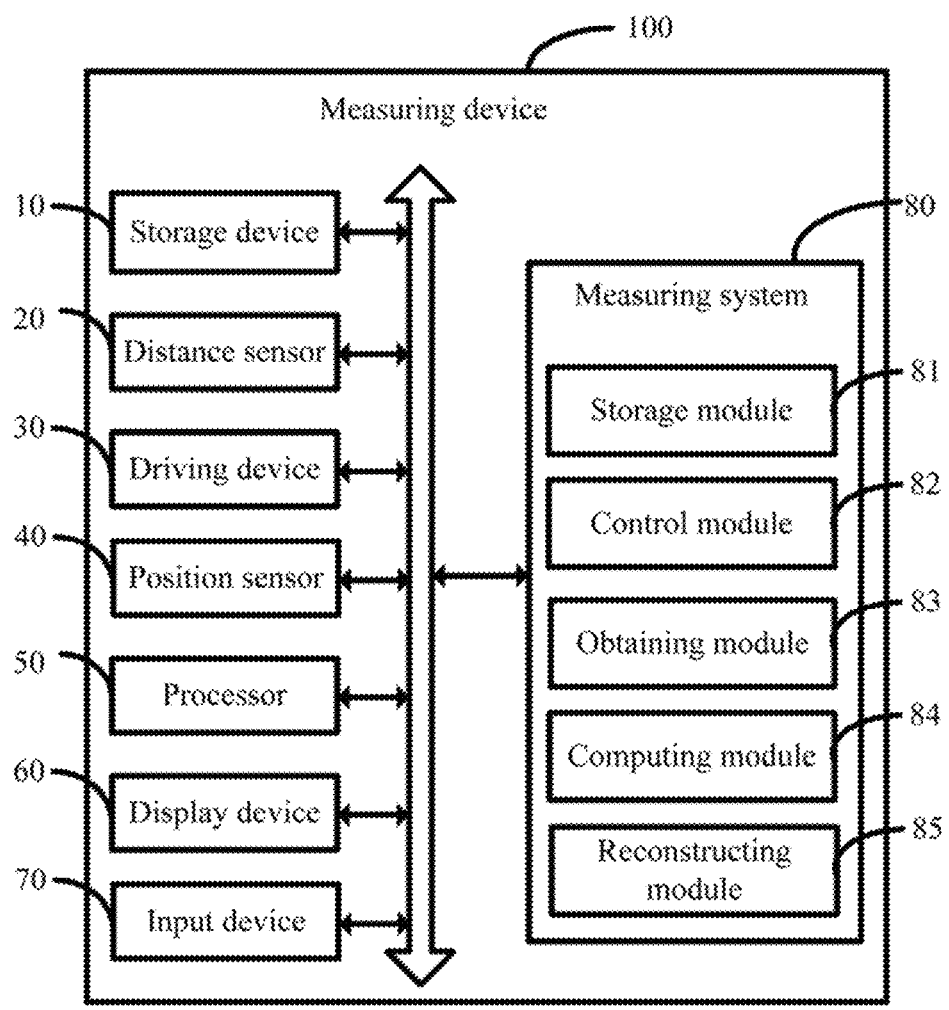
FIG. 2 is a schematic view illustrating an exemplary embodiment of the functional blocks of the measuring device of FIG. 1.

FIG. 2 shows the functional blocks of the measuring device 100 of the present disclosure. In the present embodiment, the measuring device 100 may include, but is not limited to, a storage device 10, a distance sensor 20, a driving device 30, a position sensor 40, at least one processor 50, a display device 60, and an input device 70.

The storage device 10 can be embedded inside the measuring device 100, or can be an independent device that can exchange data with the measuring device 100. For example, the storage device 10 can be a secure digital memory card, a smart media card, or a flash memory. The storage device 10 stores the all kinds of data of the measuring device 100.

The distance sensor 20 can be used to detect a first distance between each of the points on the surface of the object 200 and the distance sensor 20. The distance sensor 20 can be any sensor that can be used to detect the distance in the art. A measurement accuracy and a measurement sensitivity of the distance sensor 20 depend on an emitting frequency, an output power, and the like of the distance sensor 20. Generally, the higher the emitting frequency, the higher the measurement accuracy of the distance sensor 20, and the higher the output power, the higher the measurement sensitivity. Moreover, the measurement accuracy of the distance sensor 20 is affected by the properties of the object, such as a basic material of the object. For example, a measurement accuracy of the distance sensor 20 measuring a metal object is better that a measurement accuracy of the distance sensor 20 measuring human skin, since the metal object perfectly reflects the emitting wave from the distance sensor 20, while the human skin absorbs a portion of the emitting wave.

A user can adjust the emitting frequency and the output power of the distance sensor 20 according to the properties of the object in order to have a better measurement accuracy. The form of the distance sensor 20 has no limitation, it can be electromagnetic distance sensor, a laser distance sensor, or an ultrasonic distance sensor. Each type of distance sensor has advantages and disadvantages, and is selected by the user in consideration of different demands. In the present disclosure, the distance sensor is a ultrasonic distance sensor.

Figure 3:
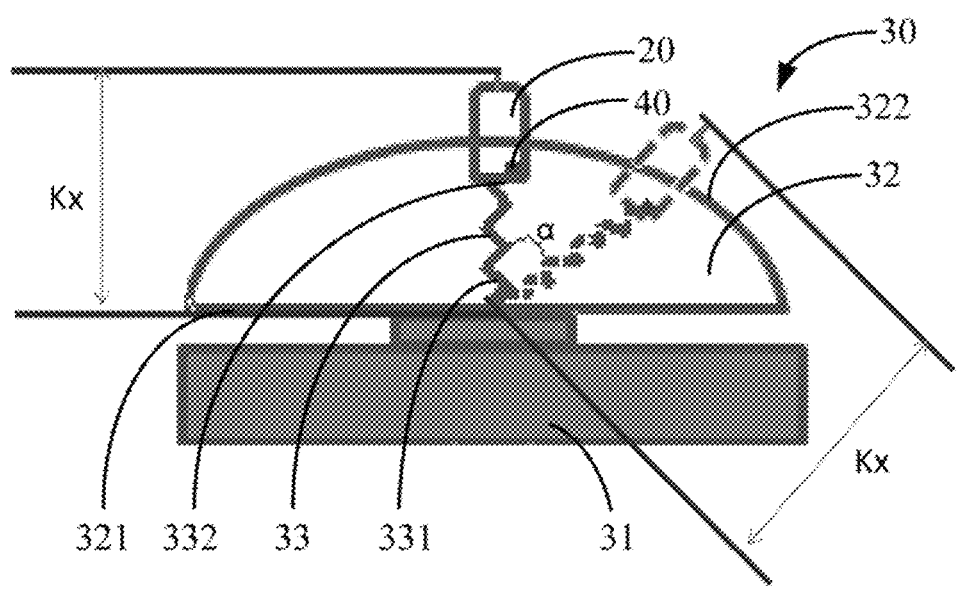
FIG. 3 is a schematic view illustrating a structure of the measuring device of FIG. 1.

FIG. 3 shows the structure of the measuring device 100 of the present disclosure. The distance sensor 20 is installed on the driving device 30, the driving device 30 provides power to the distance sensor 20. The distance sensor 20 can be moved to different positions under the driving of the driving device 30. Therefore, the distance sensor 20 can measure the distances between each of the points of the surface of the object 200 and the distance sensor 20.

Figure 4:
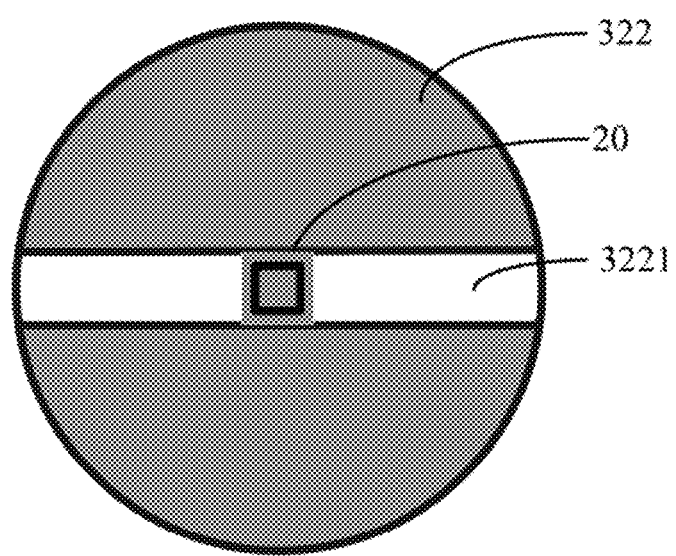
FIG. 4 is a schematic plan view of a driving device of the measuring device of FIG. 1.

Referring to FIG. 4, the driving device 30 includes a motor 31, a rotor 32, and an elastic component 33. The rotor 32 is installed on the motor 31, and rotates when driven by the motor 31. In the present embodiment, the rotor 32 is installed on a rotation axis of the motor 31, so the rotor 32 rotates coaxially with the motor 31 when driven by the motor 31. The rotor 32 includes a bottom plate 321 and an upper shell 322, the upper shell 322 is fixed on the bottom plate 321. The bottom plate 321 is fixed on the motor 31. The upper shell 322 is hemispherical and defines a sliding slot 3221. The elastic component 33 is received and fixed in the sliding slot 3221. In at least one embodiment, the sliding slot 3221 is a sliding slot in a semicircle, the sliding slot 3221 is opened at both arc ends of the upper shell 322 and revealing a spherical center of the rotor 32. A first end 331 of the elastic component 33 is fixed at a center of the bottom plate 321 of the rotor 32. In other words, the motor 31, the rotor 32, and the elastic component 33 can rotate coaxially. A second end 332 of the elastic component 33 can be slidingly received in the sliding slot 3221. The distance sensor 20 is fixed at the second end 332 of the elastic component 33. When the rotor 32 is driven by the motor 31, the elastic component 33 can slide to different positions inside the sliding slot 3221 under the effect of different centripetal forces caused by the rotation of the rotor 32. In the present embodiment, the elastic component 33 is a spring.

The position sensor 40 can be attached to the distance sensor 20. In the present embodiment, the position sensor 40 is adhesively secured on an outer surface of the distance sensor 20. The position sensor 40 detects position information of the distance sensor 20 at different positions. The position information includes a first deviation angel "θ" which corresponds to an initial position of the rotor 32, a second deviation angle "α" which corresponds to an initial position of the distance sensor 20, and a centripetal acceleration "a" of the distance sensor 20 when the distance sensor 20 rotates. In the present embodiment, in order to guarantee the measurement accuracy, the position sensor 40 is installed at a position on the distance sensor 20 which is far from the elastic component 33. The initial position of the rotor 32 is a position where the rotor 32 is static, the initial position of the distance sensor 20 is a position where the distance sensor 20 is when the rotor 32 is static and the elastic component 33 is in a natural state.

The at least one processor 50 can communicate with the position sensor 40 and the distance sensor 20. The processor 50 can further execute computerized-codes stored in the storage device 10 and compute all kinds of data stored in the storage device 10. In the present embodiment, a measuring system 80 is stored in the storage device 10. The measuring system 80 is executed by the at least one processor 50 to perform functions of the measuring device 100. The display device 60 can display various kinds of information and can be controlled by the at least one processor 50. The display device 60 can be a touch screen, a monitor, or the like. The input device 70 can be a keyboard or a mouse.

In the present embodiment, the measuring system 80 can include a storage module 81, a control module 82, an obtaining module 83, a computing module 84, and a reconstructing module 85. The modules 81-85 can include computerized codes in the form of one or more programs, which are stored in the storage device 10, and are executed by the at least one processor 50 of the measuring device 100. The term "module" in the present disclosure refers to a procedure of serial commands that can achieve certain functions.

The storage module 81 pre-stores an algorithm in the storage device 10. The algorithm is used to compute the three dimensional coordinates of points of the surface of the object 200. The algorithm includes a plurality of parameters, the plurality of parameters includes a parameter "m" of a reference coordinate, the position information of the distance sensor 20, and the first distance between the distance sensor 20 and a point on the surface of the object 200.

Figure 5:
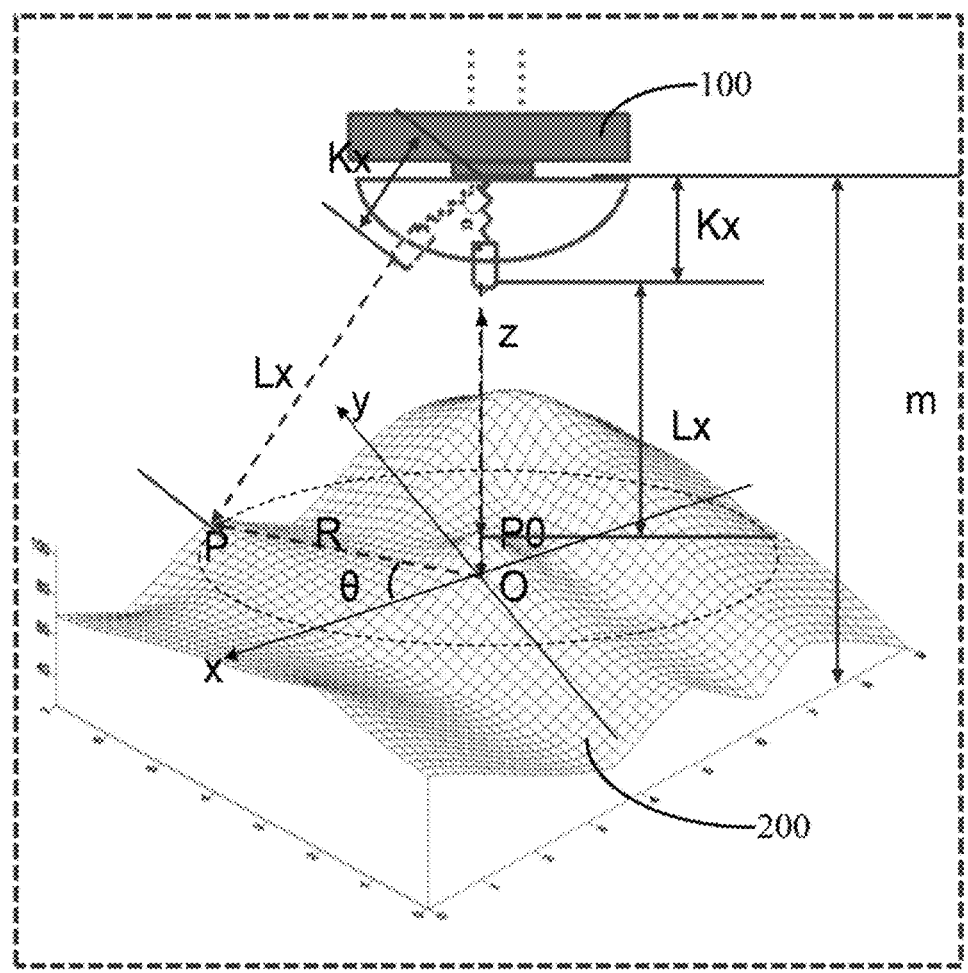
FIG. 5 illustrates working principles of the measuring device of FIG. 1, to compute three dimensional coordinates.

FIG. 5 illustrates the working principles of the measuring device 100 of the present disclosure, to compute three dimensional coordinates of points of the surface of the object 200. In the present embodiment, a position of the reference coordinate is determined by the parameter "m". A z axis of the reference coordinate is a straight line on which the elastic component 33 falls when the distance sensor 20 is at its initial position. The xy plane of the reference coordinate is a reference plane vertical to the z axis, the x axis of the xy plane is a straight line of a projection of the sliding slot 3221 on the xy plane. A specific position of the xy plane is determined by the parameter "m", where "m" is a distance from the bottom plate 321 to the xy plane. The parameter "m" can be a distance between the bottom plate 321 (or the first end 331 of the elastic component 33) and the lowest point of the surface of the object 200. The parameter "m" can also be a value set according to user's requirement. In other words, the xy plane can be a plane which passes through the lowest point of the surface of the object 200, or the xy plane can be a plane that is determined by "m" set by a user.

In the reference coordinate, it is assumed that when the distance sensor 20 is at its initial position, a coordinate of a point P0 on the surface of the object 200 is (x0, y0, z0), wherein x0=0, y0=0, and z0=m-kx-lx.

As shown in FIG. 5, a position of an arbitrary point P (x, y, z) on the surface of the object 200 can be determined by P0 and corresponding parameters. The algorithm is as follows:

$$x = R * \cos \theta - (kx + lx) * \sin \alpha \cos \theta$$

$$y = R * \sin \theta - (kx + lx) * \sin \alpha \sin \theta$$

$$z = m - (kx + lx) * \cos \alpha$$

Wherein "kx" represents a second distance between the distance sensor 20 and the first end 331 of the elastic component 33. The "kx" equals a natural length "L" of the elastic component 33 plus a stretching length "k*a" of the elastic component 33 when the elastic component 33 is stretched by the rotor 32, therefore kx=L+k*a. The natural length "L" can be defined to be a length of the elastic component 33 when the elastic component 33 has no elastic deformation. In the equation, "k" represents an elastic coefficient of the elastic component 33, which is relevant to the property of the elastic component 33. The elastic coefficient "k" of the elastic component 33 is a constant value. "a" represents the centripetal acceleration of the distance sensor 20, which is a variable and is measured by the position sensor 40. That is, "kx" is a variable determined by the centripetal acceleration "a" measured by the position sensor 40.

In the above equation, "lx" represents the first distance between the distance sensor 20 and the point P. "lx" is a variable and is measured by the distance sensor 20. "α" represents the deviation angle corresponded to the initial position of the distance sensor 20. "α" is a variable and is measured by the position sensor 40. "θ" represents the deviation angle corresponded to the initial position of the rotor 32. "θ" is a variable and is measured by the position sensor 40.

The control module 82 can control the driving device 30 to drive the distance sensor 20 to move to different measuring positions, in order to measure the first distance between each of the points on the surface of the object 200 and the distance sensor 20. In at least one embodiment, the control module 82 can control the motor 31 to rotate at different speeds by emitting different current impulse signals, thus deflecting the distance sensor 20 to different measuring positions. The measuring position can be defined to be a position of the distance sensor 20 where the distance sensor 20 measures the first distance between one of the points on the surface of the object 200 and the distance sensor 20.

The obtaining module 83 can acquire each first distance when the distance sensor 20 is located at each of the measuring positions. The obtaining module 83 can further acquire each position information of the distance sensor 20 when the distance sensor 20 is located at each of the measuring positions using the position sensor 40. That is, each position information of the distance sensor 20 corresponds to a first distance.

The computing module 84 can determine the parameter "m" of the reference coordinate. The computing module 84 can compute the three dimensional coordinates of each of the points on the surface of the object 200 and obtain a plurality of computed three dimensional coordinates, using the algorithm pre-stored in the storage device 10 based on the parameter "m", the first distance, and the position information corresponds to the first distance. The parameter "m" can be a predetermined value pre-stored in the storage device 10. The parameter "m" can also be a value set by a user through the input device 70.

The reconstructing module 85 can plot a three dimensional figure of the object 200 based on the plurality of computed three dimensional coordinates. The reconstructing module 85 can further display the three dimensional figure of the object 200 on the display device 60.

Figure 6:
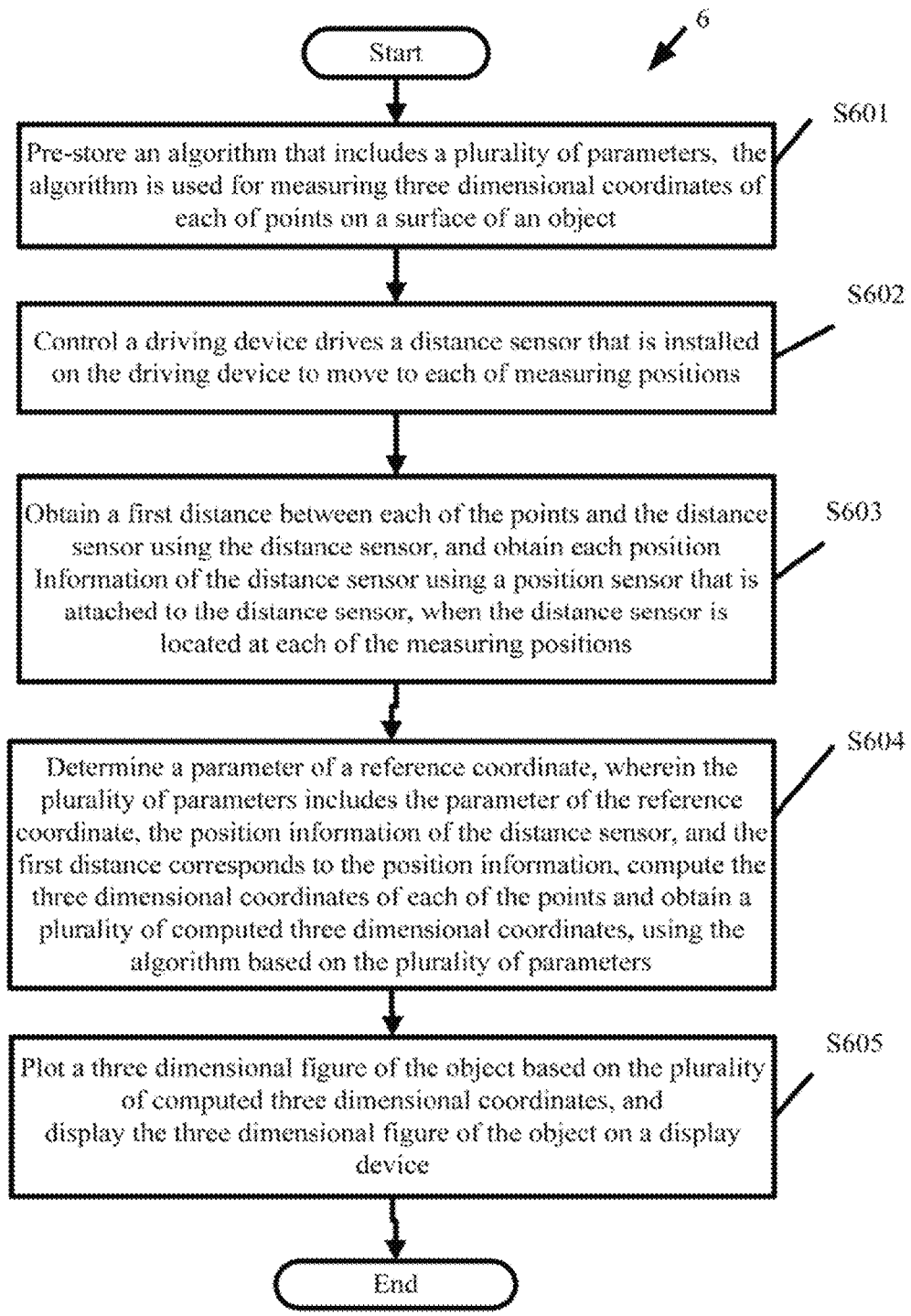
FIG. 6 illustrates a flow chart of a method for measuring three dimensional coordinates of points of an object.

FIG. 6 illustrates a flowchart which is presented in accordance with an example embodiment. The example method 6 is provided by way of example, as there are a variety of ways to carry out the method. The method 6 described below can be carried out using the configurations illustrated in FIGS. 1-4, for example, and various elements of these figures are referenced in explaining example method 6. Each block shown in FIG. 6 represents one or more processes, methods, or subroutines, carried out in the example method 6. Additionally, the illustrated order of blocks is by example only and the order of the blocks can be changed according to the present disclosure. The example method 6 can begin at block S601. Depending on the embodiment, additional steps can be added, others removed, and the order of the steps can be changed.

At block S601, the storage module 81 can pre-store an algorithm in the storage device 10. The algorithm is used to compute the three dimensional coordinates of points of the surface of the object 200. The algorithm includes a plurality of parameters, the plurality of parameters includes a parameter "m" of a reference coordinate, the position information of the distance sensor 20, and the first distance between the distance sensor 20 and a point on the surface of the object 200. In other embodiments, when the storage device 10 has already stored the algorithm, the block S601 can be omitted.

At block S602, the control module 82 can control the driving device 30 to drive the distance sensor 20 to move to different measuring positions, in order to measure the first distance between each of the points on the surface of the object 200 and the distance sensor 20.

In at least one embodiment, the control module 82 can control the motor 31 to rotate at different speeds by emitting different current impulse signals, thus deflecting the distance sensor 20 to different measuring positions. The measuring position can be defined to be a position of the distance sensor 20 where the distance sensor 20 measures the first distance between one of the points on the surface of the object 200 and the distance sensor 20.

At block S603, the obtaining module 83 can acquire each first distance when the distance sensor 20 is located at each of the measuring positions. The obtaining module 83 can further acquire each position information of the distance sensor 20 when the distance sensor 20 is located at each of the measuring positions using the position sensor 40. That is, each position information of the distance sensor 20 corresponds to a first distance.

At block S604, the computing module 84 can determine the parameter "m" of the reference coordinate. The computing module 84 can compute the three dimensional coordinates of each of the points on the surface of the object 200 and obtain a plurality of computed three dimensional coordinates, using the algorithm pre-stored in the storage device 10 based on the plurality of parameters, i.e., the parameter "m", the first distance, and the position information corresponded to the first distance. The parameter "m" can be a predetermined value pre-stored in the storage device 10. The parameter "m" can also be a value set by a user through the input device 70.

At block S605, the reconstructing module 85 can plot a three dimensional figure of the object 200 based on the plurality of computed three dimensional coordinates. The reconstructing module 85 can further display the three dimensional figure of the object 200 on the display device 60.

According to the above recitation, we can see that the present disclosure controls a distance sensor to move to each of the measuring positions to measure each of the points on the surface of an object. The present disclosure computes the three dimensional coordinates of each of the points on the surface of the object and obtain a plurality of computed three dimensional coordinates, using the algorithm pre-stored in a storage device based on the parameter "m", the first distance, and the position information corresponded to the first distance. The present disclosure can reconstruct the surface of the object. The present disclosure can be used to record facial features of human faces, to measure a size of an object, and to survey a terrain. The structure of the measuring device of the present disclosure is simple, less costly and easy for mass production and promotion.

The embodiments shown and described above are only examples. Many details are often found in the art such as the other features of a source scheduling method, and a wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the board general meaning of the terms used in the claims. It will therefore be appreciated that the embodiments described above may be modified within the scope of the claims.

What is claimed is:

1. A measuring device for measuring three dimensional coordinates of each of points on a surface of an object, the measuring device comprising:
   a storage device pre-storing an algorithm, wherein the algorithm comprises a plurality of parameters;
   a driving device;
   a distance sensor being installed on the driving device, wherein the driving device drives the distance sensor to move to each of measuring positions, the distance sensor measures a first distance between one of the points and the distance sensor;
   a position sensor being attached to the distance sensor, wherein the position sensor measures each position information of the distance sensor when the distance sensor is located at each of the measuring positions; and
   a processor, configured to communicate with the distance sensor, the position sensor and the storage device, to determine a parameter of a reference coordinate;
   wherein the plurality of parameters comprises the parameter of the reference coordinate, the position information of the distance sensor, and the first distance corresponded to the position information;
   wherein the processor computes the three dimensional coordinates of each of the points and obtains a plurality of computed three dimensional coordinates, using the algorithm based on the plurality of parameters;
   wherein the driving device comprises a motor, a rotor, and an elastic component, a first end of the rotor is installed on the motor, the rotor rotates coaxially with the motor when the rotor is driven by the motor, a second end of the rotor defines a sliding slot, a first end of the elastic component is received and fixed in the sliding slot, the distance sensor is fixed to a second end of the elastic component.

2. The measuring device as claimed in claim 1, further comprising:
   a display device, wherein the processor further plots a three dimensional figure of the object based on the plurality of computed three dimensional coordinates, and displays the three dimensional figure of the object on the display device.

3. The measuring device as claimed in claim 1, wherein the rotor comprises a bottom plate and an upper shell, the upper shell is fixed on the bottom plate, the bottom plate is fixed on the motor, the upper shell is hemispherical and defines the sliding slot, the elastic component is received and fixed in the sliding slot, the sliding slot is a sliding slot in a semicircle and is opened at both arc ends of the upper shell and revealing a spherical center of the rotor, the first end of the elastic component is fixed at a center of the bottom plate of the rotor, the second end of the elastic component is slidingly received in the sliding slot.

4. The measuring device as claimed in claim 1, wherein the position information comprises a first deviation angle which corresponds to an initial position of the rotor, a second deviation angle which corresponds to an initial position of the distance sensor, and a centripetal acceleration of the distance sensor when the distance sensor rotates.

5. The measuring device as claimed in claim 1, wherein a z axis of the reference coordinate is a straight line on which the elastic component falls when the distance sensor is at its initial position, an xy plane of the reference coordinate is a reference plane vertical to the z axis, an x axis of the xy plane is a straight line of a projection of the sliding slot on the xy plane, a specific position of the xy plane is determined by the parameter of the reference coordinate, wherein the parameter of the reference coordinate is a distance from the first end of the elastic component to the xy plane.

6. The measuring device as claimed in claim 1, wherein the elastic component is a spring.

7. The measuring device as claimed in claim 1, further comprising an input device, wherein the parameter of the reference coordinate is a value set by a user through the input device.

8. The measuring device as claimed in claim 1, wherein the distance sensor is an ultrasonic distance sensor.

9. A method for measuring three dimensional coordinates of each of points on a surface of an object, wherein the method comprises:
   pre-storing an algorithm, wherein the algorithm comprises a plurality of parameters;
   controlling a driving device to drive a distance sensor that is installed on the driving device to move to each of measuring positions, and obtaining a first distance between one of the points and the distance sensor using the distance sensor;
   obtaining each position information of the distance sensor using a position sensor that is attached to the distance sensor, when the distance sensor is located at each of the measuring positions;
   determining a parameter of a reference coordinate, wherein the plurality of parameters comprises the parameter of the reference coordinate, the position information of the distance sensor, and the first distance corresponded to the position information; and
   computing the three dimensional coordinates of each of the points and obtaining a plurality of computed three dimensional coordinates, using the algorithm based on the plurality of parameters;
   wherein the driving device comprises a motor, a rotor, and an elastic component, a first end of the rotor is installed on the motor, the rotor rotates coaxially with the motor when the rotor is driven by the motor, a second end of the rotor defines a sliding slot, a first end of the elastic component is received and fixed in the sliding slot, the distance sensor is fixed to a second end of the elastic component.

10. The method as claimed in claim 9, further comprising:
    plotting a three dimensional figure of the object based on the plurality of computed three dimensional coordinates; and displaying the three dimensional figure of the object on a display device.

11. The method as claimed in claim 9, wherein the rotor comprises a bottom plate and an upper shell, the upper shell is fixed on the bottom plate, the bottom plate is fixed on the motor, the upper shell is hemispherical and defines the sliding slot, the elastic component is received and fixed in the sliding slot, the sliding slot is a sliding slot in a semicircle and is opened at both arc ends of the upper shell and revealing a spherical center of the rotor, the first end of the elastic component is fixed at a center of the bottom plate of the rotor, the second end of the elastic component is slidingly received in the sliding slot.

12. The method as claimed in claim 9, wherein the position information comprises a first deviation angle which corresponds to an initial position of the rotor, a second deviation angle which corresponds to an initial position of the distance sensor, and a centripetal acceleration of the distance sensor when the distance sensor rotates.

13. The method as claimed in claim 9, wherein a z axis of the reference coordinate is a straight line on which the elastic component falls when the distance sensor is at its initial position, an xy plane of the reference coordinate is a reference plane vertical to the z axis, an x axis of the xy plane is a straight line of a projection of the sliding slot on the xy plane, a specific position of the xy plane is determined by the parameter of the reference coordinate, wherein the parameter of the reference coordinate is a distance from the first end of the elastic component to the xy plane.

14. The method as claimed in claim 9, wherein the elastic component is a spring.

15. The method as claimed in claim 9, wherein the parameter of the reference coordinate is a value set by a user through an input device.

16. The method as claimed in claim 9, wherein the distance sensor is an ultrasonic distance sensor.

* * * * *